(12) United States Patent
Bodin

(10) Patent No.: US 7,571,124 B2
(45) Date of Patent: Aug. 4, 2009

(54) LOCATION BASED SERVICES VIRTUAL BOOKMARKING

(75) Inventor: William Kress Bodin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1385 days.

(21) Appl. No.: 09/961,943

(22) Filed: Sep. 24, 2001

(65) Prior Publication Data

US 2003/0061110 A1 Mar. 27, 2003

(51) Int. Cl.
*G07F 7/00* (2006.01)
(52) U.S. Cl. .......................................... 705/27; 705/22
(58) Field of Classification Search ................... 705/26, 705/27, 22, 28
See application file for complete search history.

(56) References Cited

U.S. PATENT DOCUMENTS

| | | | | |
|---|---|---|---|---|
| 5,923,252 A * | 7/1999 | Sizer et al. | ............... | 340/573.1 |
| 5,932,252 A * | 8/1999 | Morris et al. | ............... | 424/717 |
| 6,182,113 B1 | 1/2001 | Narayanaswani | ........... | 709/203 |
| 6,208,995 B1 | 3/2001 | Himmel et al. | ............. | 707/104 |
| 6,211,871 B1 | 4/2001 | Himmel et al. | ............. | 345/335 |
| 6,304,855 B1 * | 10/2001 | Burke | ........................... | 705/27 |
| 6,317,718 B1 * | 11/2001 | Fano | .............................. | 705/1 |
| 6,392,548 B2 * | 5/2002 | Farringdon et al. | ...... | 340/573.1 |
| 6,401,085 B1 * | 6/2002 | Gershman et al. | ............. | 707/4 |
| 6,424,264 B1 * | 7/2002 | Giraldin et al. | .......... | 340/573.1 |
| 6,522,875 B1 * | 2/2003 | Dowling et al. | .......... | 455/414.3 |
| 6,542,812 B1 * | 4/2003 | Obradovich et al. | ........ | 701/207 |
| 6,571,279 B1 * | 5/2003 | Herz et al. | ................... | 709/217 |
| 6,587,835 B1 * | 7/2003 | Treyz et al. | .................... | 705/14 |
| 6,707,889 B1 * | 3/2004 | Saylor et al. | ............. | 379/88.04 |
| 6,741,853 B1 * | 5/2004 | Jiang et al. | ................... | 455/418 |
| 6,819,267 B1 * | 11/2004 | Edmark et al. | ............... | 340/988 |
| 6,961,751 B1 * | 11/2005 | Bates et al. | ................. | 709/203 |
| 7,010,748 B1 * | 3/2006 | Minenko et al. | ............ | 715/739 |
| 7,017,159 B1 * | 3/2006 | Baker | .......................... | 719/310 |
| 2002/0156832 A1 * | 10/2002 | Duri et al. | ................... | 709/203 |

FOREIGN PATENT DOCUMENTS

| | | |
|---|---|---|
| EP | 0957437 | 11/1999 |
| EP | 1022666 | 7/2000 |
| EP | 1061440 | 12/2000 |
| JP | 2001195461 A * | 7/2001 |
| WO | WO0054182 | 9/2000 |

OTHER PUBLICATIONS

IBM Dossier #B0C919990074.

* cited by examiner

*Primary Examiner*—Elaine Gort
(74) *Attorney, Agent, or Firm*—Robert H. Frantz; Libby Z. Handelsman

(57) ABSTRACT

A location based service creates a bookmark to a physical point of interest by detecting a consumer presence at a physical location using a presence detector; determining a physical location and identity of the consumer from an identifier; prior to receiving a selection from the consumer, determining a set of points of interest in the physical vicinity; pushing to a consumer pervasive device the set of points of interest in the vicinity of the consumer; and receiving a selection by the consumer from the pushed set of points of interest; storing on a server the received selection to create a point of interest bookmark associated with the consumer.

20 Claims, 4 Drawing Sheets

LOCATION BASED SERVICES VIRTUAL BOOKMARKING

CROSS-REFERENCE TO RELATED APPLICATIONS

Claiming Benefit Under 35 U.S.C. 120

This application is related to U.S. patent application Ser. No. 09/935,393 (to be amended after serial number has been assigned), filed on Aug. 23, 2001, by William Kress Bodin.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATED BY REFERENCE

The related application, U.S. patent application Ser. No. 09/935,393 (to be amended after serial number has been assigned), filed on Aug. 23, 2001, by William Kress Bodin, is hereby incorporated in its entirety, including drawings and figures.

BACKGROUND OF THE INVENTION

1. Field of the Invention

This invention relates to the arts of shopping, retail, and consumer display technologies, including location based services and technologies for increasing the convenience and efficiency of such services.

2. Description of the Related Art

Handheld devices such as personal digital assistants (PDA) and wireless-application protocol (WAP) enabled cellular phones are bringing greater on-line capabilities to consumers. Consumers may use their networked PDA's and WAP phones to access information, such as news, investment and weather web sites, as well as to receive and send electronic mail (email).

Location-based services (LBS) is a relatively new field of application wherein handheld and portable networked devices combine information regarding the location or position of a consumer (and his or her device) to deliver location-relevant information and services. For example, as a consumer enters a train station, his or her cell phone may make contact with a local server which begins to deliver information about train schedules, fares, and special rates to the device. The consumer, then, can quickly review the information, and may submit a purchase request or form to the local server to buy a ticket or reserve a seat. Additional information may also be available if the consumer selects an query icon or menu choice, such as whether or not a particular train provides food or meal service in route.

LBS incorporates the use of several types of technologies. For the handheld terminal device, a WAP-enabled cell phone or PDA equipped with a wireless networking interface may be used.

For determining the location of the consumer with a high degree of precision, technology such as the satellite-based Global Positioning System (GPS) may be used for geographic positioning within several meters. For less precise or regional positioning, technology such as Bluetooth or the Federal Communication Commission's Enhanced Wireless 911 (E911) initiative can be employed. Bluetooth is a computing and telecommunications industry open standard which provides a short-range wireless network connection between two devices such as mobile phones, computers, PDA's, etc. The FCC's E911 initiative provides a method for pinpointing the location of a cellular phone user, primarily intended for emergency purposes, but having commercial use potential as well.

For networking the terminal device to a server or a computer network, Bluetooth, wireless local area network (LAN), or infrared (IrDA) technologies may be used.

All of these basic technologies are well known in the art, and are being combined in new ways to provide LBS services and products.

In the related patent application, a system and method were disclosed which provided a more practical location based service which employs small, inexpensive radio frequency identification (RFID) devices to locate a consumer within a retail space, and to provide automatic information regarding products on display to the consumer. The RFID of the preferred embodiment was of the type often used for antitheft systems, usually consisting of a small integrated circuit device with an antenna for receiving energy induced by an RF field created by a door gate device. When the device is powered up when it is in the RF field, it transmits a code or signal which is then received by the door gate device to determine if the product is being removed from the retail premise illegally.

In the manner of use of the related patent application, the RFID is embedded in a retail store credit card, and a modified gate device is placed near or underneath product displays within the retail space. As the consumer moves near the modified gate device, the RFID is powered up, and transmits it's code, which is correlated to the consumer's ID. Combining this information with the known location of the modified gate device, such as a shoe display, a database of the consumer's preferences is accessed to retrieve relevant information, such as the consumer's shoe size. Then, the system may access a store inventory database to determine which items on display (e.g., shoes) are available which match the consumer's preferences (e.g., the consumer's shoe size), and a special indication is given to the consumer to bring those products to his or her attention (e.g., illumination of an LED underneath a sample on display).

So, the system and method of the related application could be considered a type of LBS which does not require the use of GPS, E911, a cell phone or a PDA, in order to achieve it's primary objective. In a secondary objective, the invention of the related patent application can also automatically send detailed product information to the consumer's personal computer or pervasive device (PDA or cell phone), such as an electronic product brochure, for immediate or later review by the consumer. This is useful for allowing the consumer to collect brochures and detailed information in electronic form, rather than paper form, which allows the information to be retained more reliably, and avoids the need for the retailer to keep on hand copies of printed product documentation.

As a consumer travels from one retail establishment to another shopping for goods and services, he or she will likely see many similar products with similar characteristics at several retail locations. For example, a consumer may visit three electronics retailers during a one-day shopping trip for a home theater system. Several days later, that same consumer may visit two more retailers. In some cases, he or she may collect printed brochures regarding some of the products seen, or even electronic brochures as provided by the invention of the related application. However, it may be difficult for the consumer to recall which retail establishment had each of the products and models for which he collected information.

"Bookmarking" is a term used related to web browsing, and specifically relates to the recording of a web address for a web site or page to which a user may want to return at a later time or date. For example, a web browser user during a particular browsing session may visit 50 web sites and pages. If the user sees an interesting web page he or she may want to view again later, he or she may either print it out or simply create a new bookmark in the web browser. Then, during a subsequent browsing session, the user may simply retrieve the bookmark and automatically return to the page or site of interest.

This paradigm of viewing a multitude of web sites and pages and needing to remember only certain, specific pages for later review is similar to the scenario of trying to remember specific points of interest or retailers which were visited during shopping trips. However, a shopper must either take careful notes of where certain things were seen, trust his or her memory, or retrace his her initial sequence of visits, none of which are reliable or efficient methods of returning to the point of interest.

Therefore, there is a need in the art for a system and method which allows a user to quickly and efficiently record points of interest for later review while shopping and visiting retail establishments, public facilities, and the like. Preferably, this system and method would be useful not only for recording points of interest for retail products and services on display for sale and services, but also for items on display which are not for sale but which may evoke continuing interest by visitors and viewers, such as items on display in a museum, convention, or trade show. Additionally, there is a need in the art for this system and method to be useful from a plurality of terminal types, such as personal computers, wireless phones, and PDA's.

BRIEF DESCRIPTION OF THE DRAWINGS

The following detailed description when taken in conjunction with the figures presented herein provide a complete disclosure of the invention.

SUMMARY OF THE INVENTION

A location based service creates a bookmark to a physical point of interest by detecting a consumer presence at a physical location using a presence detector; determining a physical location and identity of the consumer from an identifier; prior to receiving a selection from the consumer, determining a set of points of interest in the physical vicinity; pushing to a consumer pervasive device the set of points of interest in the vicinity of the consumer; and receiving a selection by the consumer from the pushed set of points of interest; storing on a server the received selection to create a point of interest bookmark associated with the consumer.

Location Based Services, RF Identification, and other technologies are coalesced by a pervasive device, and are assimilated by client and/or server based logic to present an opportunity for "bookmarking" a virtual reference to a specific physical object or location. Furthermore, this invention provides client and server side methods for discriminating between ambiguous objects.

DETAILED DESCRIPTION OF THE INVENTION

The present invention is preferably realized as a set of cooperating methods and sub-systems operating in a variety of terminal devices (e.g. cell phones, PDA's, etc.), consumer location subsystems (e.g. RFID, GPS, E911, Bluetooth, etc.), Internet servers and database servers, and wireless networks (e.g. IrDA, wireless LAN, wireless Internet, etc.).

Figure 1:
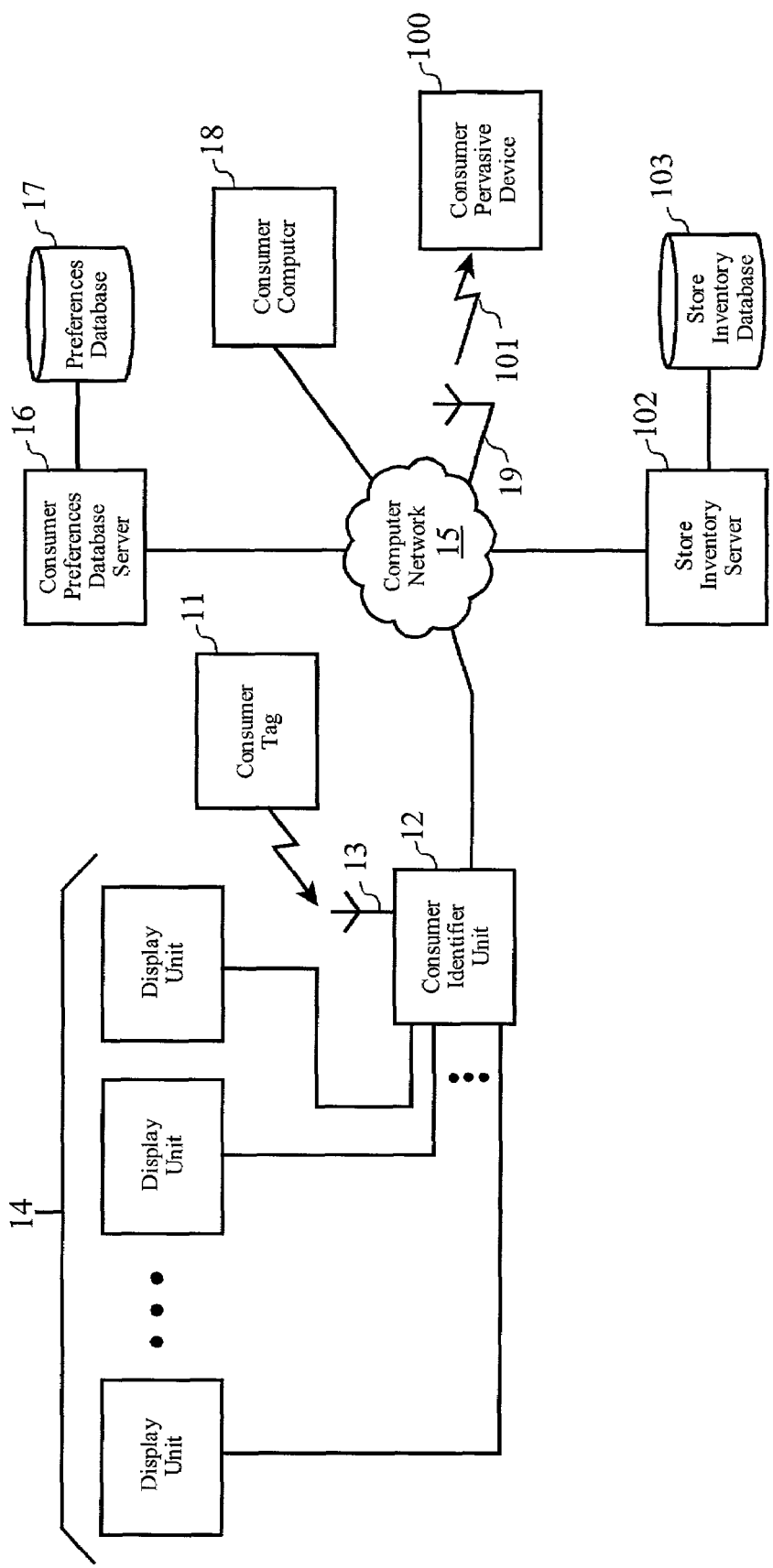
FIG. 1 provides a system overview of the invention of the related patent application, which is a component of the preferred embodiment of the present invention.

Turning to FIG. 1, the system of the related application is illustrated. In this arrangement, a consumer carrying a consumer tag (11), preferably an RFID tag embedded in a credit card, moves into the proximity of a consumer identification unit (CIDU) (12). The CIDU collects the identification code from the consumer tag (11), and then contacts a consumer preferences server (16) via a computer network (e.g., a LAN or the Internet). If any items on display in the proximity of the CIDU match the consumer's preferences, one or more display units (14) are activated or highlighted, which alerts the consumer of a matching displayed product in which he or she may have interest. Throughout this disclosure, we shall refer to such physical items on display in a broader sense as "points of interest" (POIs). In variations of this scenario, the POIs may consists of items of artwork on display in a museum, options on a train schedule, services on a menu board, etc.

For the purposes of the present invention, the consumer identification and location step can equally well be made using GPS, E911 or Bluetooth technologies instead of the RFID tag method.

In an enhanced embodiment of the related invention, the consumer may elect to have detailed product information regarding these matching displayed items sent directly to his computer (18) or pervasive device (100), such as an attachment to an email.

The preferred embodiment of the present invention is realized in conjunction with this related invention, but may alternately be realized in conjunction with other location-based services equipment and systems such as the PanGo Networks LBS system.

Figure 2:
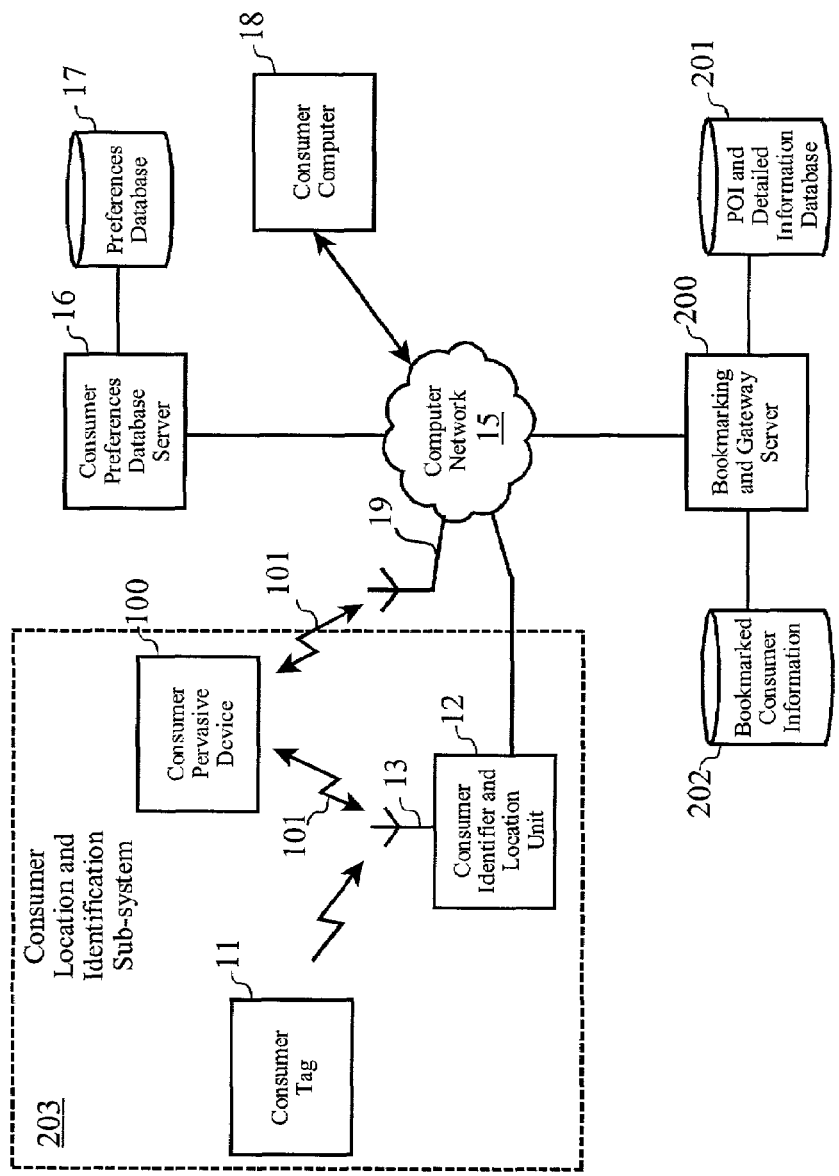
FIG. 2 illustrates the system arrangement of the present invention.

Turning to FIG. 2, the system organization of the present invention is shown. The present invention assimilates location based information (GPS, E911, etc.) and/or Radio Frequency (RFID tags, Bluetooth) information, as well as consumer identification information. According to the preferred embodiment, the RFID tag (11) and CIDU (12) are used to provide a general or regional location and identification of the consumer. Alternately, a short-range RF technology between the consumer's pervasive device (100) and the CIDU (12) such as Bluetooth may be used, as well as use of GPS coordinates. For the remainder of this disclosure, we will refer to this technology subsystem as the consumer location and identification subsystem (203).

Once the consumer's location has been established, this location is sent to a bookmarking server (200) using a method such as WAP protocol, HTTP, or other common data protocol.

The bookmarking server (200) retrieves a list of the various points of interest (POI's), which can be locations or physical items (e.g. products, services, items on display, etc.) in the proximity of the consumer's locating device (e.g. RFID, Bluetooth terminal, E991 phone, GPS receiver, etc.) from a POI datastore (210), and it assembles these POI's into an "active data list". For example, for our consumer shopping for a home theater system, a complete list of items on display in an electronics store (stereos, computers, televisions, etc.) is reduced to only the items in the vicinity of the consumer's location (home theater components), which are then placed into the "active data list" (ADL).

The ADL is delivered to the consumer's pervasive device (100), such as a WAP-enabled phone or networked PDA, in the form of a return from a servlet or portlet on the bookmarking server (200).

This returned data is then used to allow the consumer to discriminate between categories of points of interests (restaurants, or products on a store front window). For example, the list of available information regarding products in the proximity of the consumer's present location may be displayed with check boxes on the consumer's PDA.

The consumer may select one or more of the items from the list, and may select an action icon such as "Create Bookmarks" from the display. For example, if the consumer were standing in front of a display of several home theater components, he could select one or more specific makes and models of products from the list to bookmark, perhaps a Sony Model 123 and a Panasonic Model 987. In other scenarios, he may select certain train schedules in a train station or pieces of artwork in a museum, for example.

When the selected sublinks of the servlet-returned data are exercised by the consumer, a transaction broadcasts the POI location or product-related data as a bookmark, and may also transmit detailed electronic information (e.g., an email or electronic document file) to a configured gateway server. So, for our example, specifications and product brochures for the Sony Model 123 and Panasonic Model 987 may be stored on the gateway server. According to the preferred embodiment, the gateway server is the same server as the bookmarking server (200), but could alternately be another server. Also according to the preferred embodiment, the detailed product information files are stored in a consumer information (202) datastore accessible by the gateway server (200).

This gateway server (200) then makes this bookmark available to the consumer from any number of devices, including his or her home computer, work computer, and other pervasive devices. For example, the bookmarks may be placed on the consumer's "home page" by the gateway server so that the consumer may later access the home page from his or her home or office computer to retrieve the information. Or, during a subsequent shopping trip, the consumer may use his WAP phone to access his home page and to retrieve the stored product information. For example, the consumer may retrieve the Sony Model 123 product brochure via his WAP phone while standing in front of a competitive product so that he may compare features, performance and prices of the units.

Radio Frequency enablement allows for the further refinement of the scope of the portlet data. Typical RF ranges are from miles down to centimeters or less. With this degree of granularity, discrimination is acute between POIs of close proximity.

Figure 3:
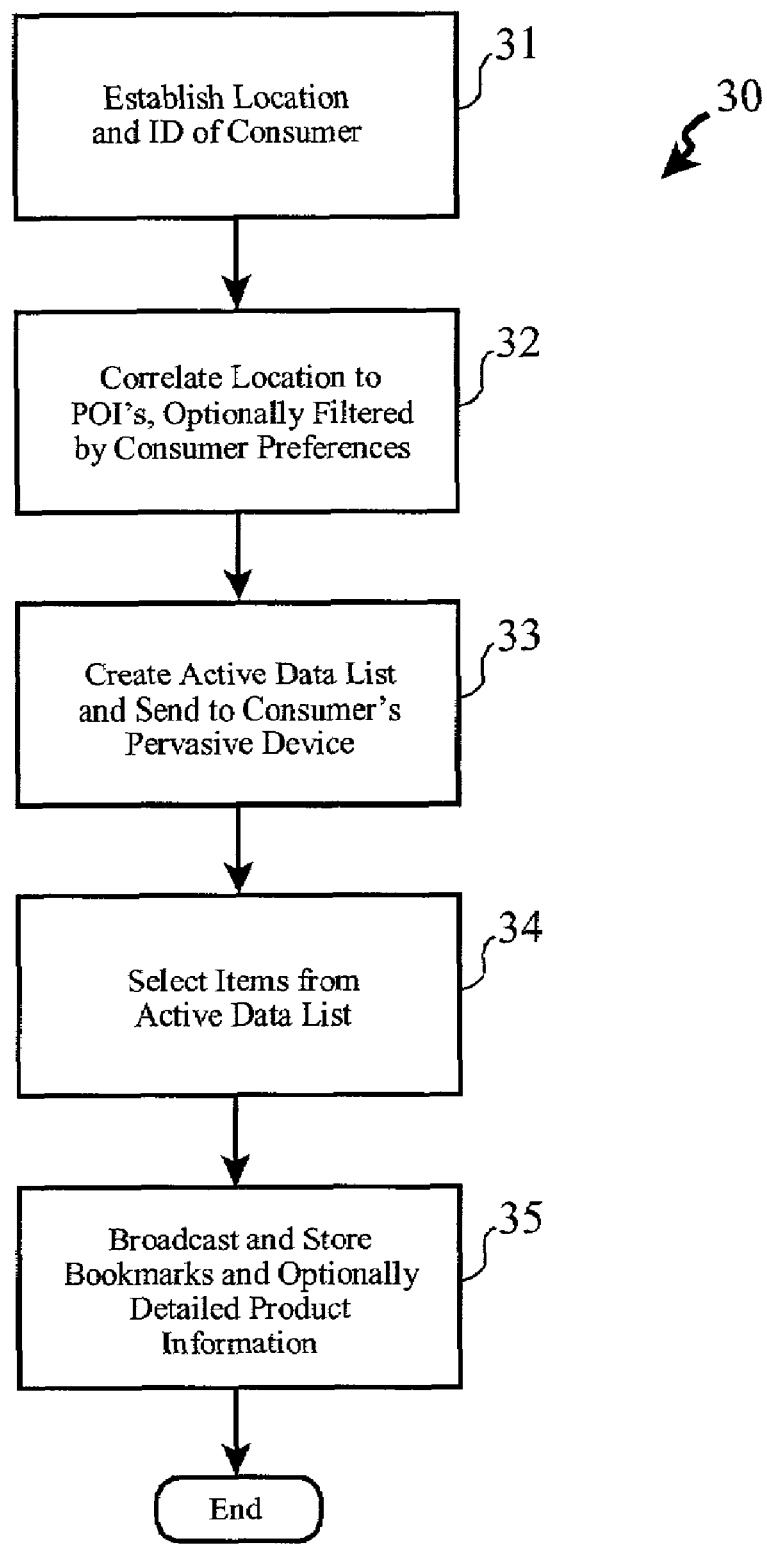
FIG. 3 sets forth the logical process of the method of the invention.

Turning to FIG. 3, the logical process of the invention is shown for creation of bookmarks and optional distribution of detailed product information. First, the location and identification of the consumer is established (31) using any of the methods previously disclosed (GPS, E911, Bluetooth, RFID tags, etc.).

Next, the consumer's location is correlated (32) to the known POIs (products, items or services) on display in the vicinity of the consumer, and optionally this group of correlated products or items is filtered by a set of consumer preferences. For example, if a consumer's preferences indicate that the consumer prefers IBM computer equipment and he is in the vicinity of several brands of products on display, only IBM computer information and bookmarks would be created.

An active data list is created (33) and transmitted to the consumer's pervasive device, such as a PDA or WAP telephone, where it is displayed for the consumer to view. The consumer may then select one or more of the POIs listed, and activate an action to create a bookmark and optionally receive detailed product information.

Upon activation (34) of the sublinks in the active data list, a bookmark is created and broadcast, preferably including any detailed product information available regarding the selected items. According to the preferred embodiment, these bookmarks and data are linked to or otherwise made available to the consumer at a point in the network accessible by all of his networked devices, such as on his or her home page, for later use and access.

Figure 4:
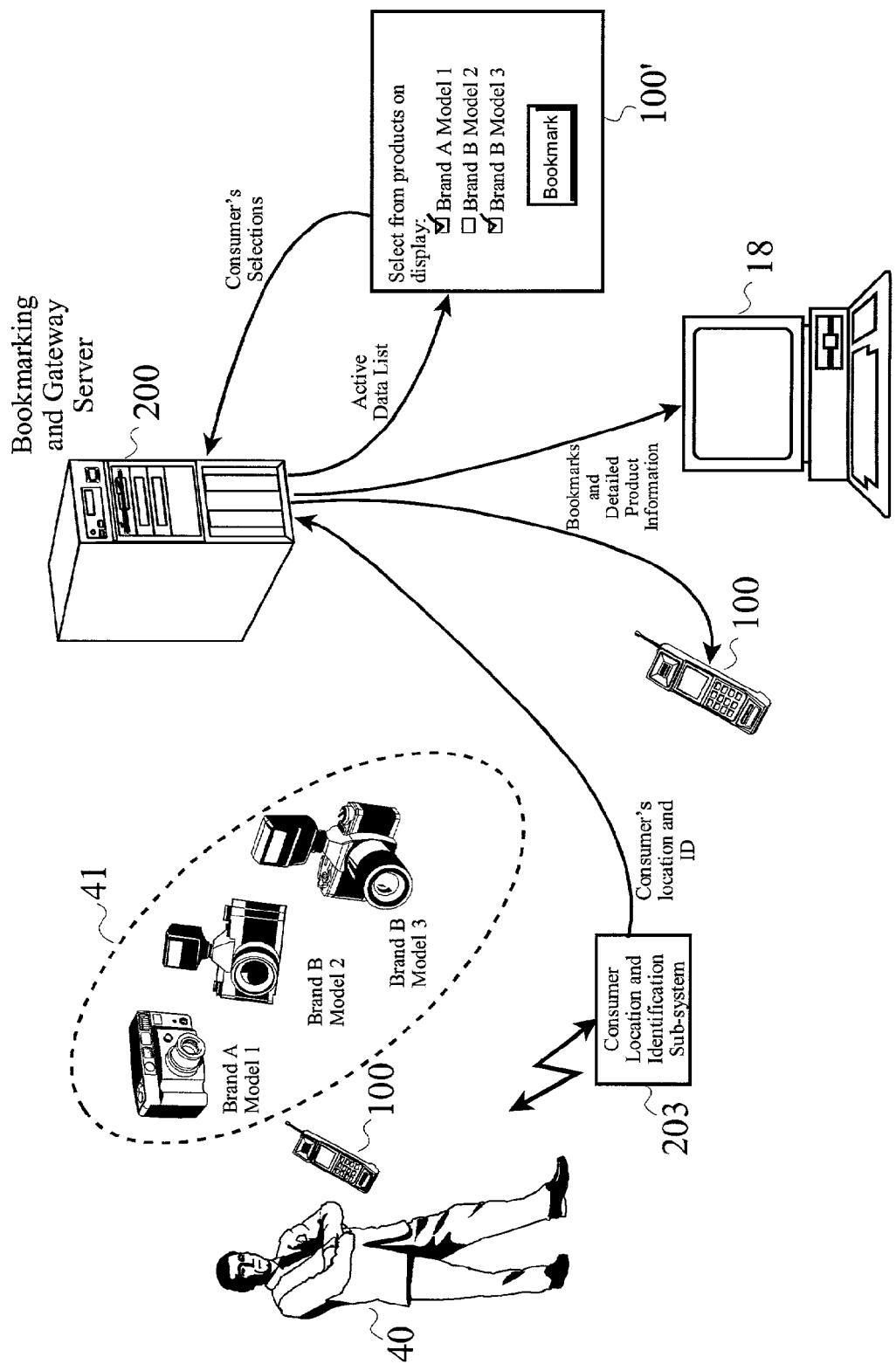
FIG. 4 provides a illustrative view of the steps and operations accomplished by the invention.

FIG. 4 illustrates the information flow and user perspective of the invention. In this example, a consumer (40) approaches a retail area (41) for several brands and models of cameras, and the consumer (40) is carrying an LBS-enabled wireless telephone (100). As the consumer enters the retail area (41) of the points of interest (e.g. the camera display), the consumer location and identification subsystem (203) identifies the consumer and reports the consumer's ID and location to the bookmarking and gateway server (200).

The server (200) then correlates the consumer's location to the cameras which are on display in that area, prepares an ADL indicating those POIs, and transmits the ADL to the consumer's telephone (100), where the list is shown on the telephone's display (100').

The consumer may select any of the POIs (e.g. cameras) in which he or she is interested from the ADL, and the selections are received by the server (200), where a bookmark and detailed product information is stored for these selections.

Subsequently, the consumer may access the bookmark(s) through a home or office computer (18), or through his or her pervasive devices including the LBS telephone.

While certain details of a preferred embodiment and some alternate technologies and methods for implementation of the invention have been disclosed, it will be readily recognized by those skilled in the art that many variations, substitutions, and alternate technology choices may be made without departing from the spirit and scope of the present invention. Therefore, the scope of the present invention should be determined by the following claims.

What is claimed is:

1. A method for providing location based services to create bookmarks to physical points of interest, comprising:
    detecting a consumer presence at a physical location using a presence detector associated with said physical location;
    determining said physical location and an identity of a consumer from a consumer identifier;
    prior to receiving a selection from said consumer, determining a set of points of interest in a physical vicinity of said consumer;
    pushing to a consumer pervasive device said set of correlated points of interest in the physical vicinity of said consumer;
    receiving at least one selection by said consumer from said pushed set of points of interest; and
    storing on a server said at least one received selection to create a point of interest bookmark associated with said consumer and having an indicator of said physical location, a description of said point of interest and zero, one or more information attachments containing information about said point of interest; and creating a bookmark for points of interest selected from said set, said bookmark providing a user-selectable link to said stored set on said bookmark server for later access by said consumer using a networked computing device.

2. The method as set forth in claim 1 wherein said step of determining a location and identity of a consumer comprises employing a technology selected from a group comprising Bluetooth and at least one RFID tag associated with said consumer.

3. The method as set forth in claim 1 wherein said step of pushing further comprises correlating said set of points of interest to one or more consumer preferences.

4. The method as set forth in claim 3 wherein said step of correlating to one or more consumer preferences comprises correlating to a preference selected from a group comprising size, price, style, brand and performance feature.

5. The method as set forth in claim 1 wherein said step of pushing comprises displaying a list on a wireless telephone.

6. The method as set forth in claim 1 wherein said step of pushing comprises displaying a list on a networked personal digital assistant.

7. The method as set forth in claim 1 wherein said step of creating a bookmark comprises creating a hyperlink on a web page on a web server.

8. The method as set forth in claim 1 further comprising the step of transmitting detailed information regarding said selected points of interest to a consumer's receiving address.

9. A computer readable memory comprising:
a computer readable memory suitable for encoding computer programs; and
one or more computer programs encoded by said computer readable memory, said programs when executed performing:
detecting a consumer presence at a physical location using a presence detector associated with said physical location;
determining said physical location and an identity of a consumer from a consumer identifier;
prior to receiving a selection from said consumer, determining a set of points of interest in a physical vicinity of said consumer;
pushing to a consumer pervasive device said set of points of interest in the physical vicinity of said consumer;
receiving at least one selection by said consumer from said pushed set of points of interest; and
storing on a server said at least one received selection to create a point of interest bookmark associated with said consumer and having an indicator of said physical location, a description of said point of interest and zero, one or more information attachments containing information about said point of interest; and
creating a bookmark for points of interest selected from said set, said bookmark providing a user-selectable link to said stored information items on said bookmark server for later access by said consumer using a networked computing device.

10. The computer readable memory as set forth in claim 9 wherein said determining a location and identity of a consumer comprises employing a technology selected from a group comprising Bluetooth and at least one RFID tag associated with said consumer.

11. The computer readable memory as set forth in claim 9 wherein said pushing comprises correlating points of interest to one or more consumer preferences.

12. The computer readable memory as set forth in claim 11 wherein said correlating points of interest to one or more consumer preferences comprises correlating to a preference selected from a group comprising size, price, style, brand and performance feature.

13. The computer readable memory as set forth in claim 9 wherein said pushing comprises displaying a list on a wireless telephone.

14. The computer readable memory as set forth in claim 9 wherein said pushing comprises displaying a list on a networked personal digital assistant.

15. The computer readable memory as set forth in claim 9 wherein said storing a bookmark comprises creating a hyperlink on a web page on a web server.

16. The computer readable memory as set forth in claim 9 further comprising computer program encoded by said computer readable memory transmitting detailed information regarding said selected items to a consumer's receiving address.

17. A system for providing location based service to create bookmarks to physical points of interest, comprising:
a presence detector detecting a consumer present at a physical location;
a consumer identification and location subsystem when executed performing:
(a) determining a consumer's identification and said physical location using a consumer identifier;
(b) prior to receiving a selection from said consumer, determining a set of points of interest in a physical vicinity of said consumer; and
(c) pushing said set of points of interest in the consumer's physical vicinity to a consumer pervasive device; and
a server storing in computer memory a consumer's selection from said pushed set of points of interest to create a bookmark associated with said consumer and having an indicator of said physical location, a description of said point of interest and zero, one or more information attachments containing information about said point of interest.

18. The system of claim 17 wherein said server transmits one or more electronic documents containing detailed information regarding said selected items.

19. The system of claim 17 wherein said consumer identifier comprises a device selected from a group comprising an RFID tag associated with said consumer, and a Bluetooth-equipped pervasive computing device and receiver.

20. The system of claim 17 wherein said consumer pervasive device is selected from a group comprising a wireless-application protocol enabled cellular telephone, a wireless-network enabled personal digital assistant, and a wireless-network enabled portable computer.

* * * * *